United States Patent [19]

Acton

[11] 4,318,467

[45] Mar. 9, 1982

[54] CONVEYORS

[75] Inventor: Ernest D. Acton, Long Bank, England

[73] Assignee: Alan Acton, Great Britain; a part interest

[21] Appl. No.: 121,782

[22] Filed: Feb. 15, 1980

[51] Int. Cl.³ .................... B65G 17/36; B65G 35/00
[52] U.S. Cl. .................................... 198/703; 198/708
[58] Field of Search ............. 198/703, 708, 540, 547, 198/525, 630, 562, 448, 449, 560, 600, 798

[56] References Cited

U.S. PATENT DOCUMENTS

| | | | |
|---|---|---|---|
| 1,126,833 | 2/1915 | Neckermann | 198/547 |
| 1,987,916 | 1/1935 | Thompson | 198/562 |
| 2,371,783 | 3/1945 | Sneed et al. | 198/630 |
| 2,476,039 | 7/1949 | Hapman | 198/708 |

*Primary Examiner*—Robert B. Reeves
*Assistant Examiner*—Brian Bond
*Attorney, Agent, or Firm*—Stanley C. Spooner

[57] ABSTRACT

A bucket conveyor includes a plurality of spaced buckets which pass through a loading zone with gaps between adjacent buckets. Flexible sheets are enclosed at their leading ends to a fixed part of the conveyor and extend over the buckets in the loading zone to cover the gaps and so prevent material passing between the gaps. The trailing end of one sheet extends beyond the leading end of the following sheet.

4 Claims, 2 Drawing Figures

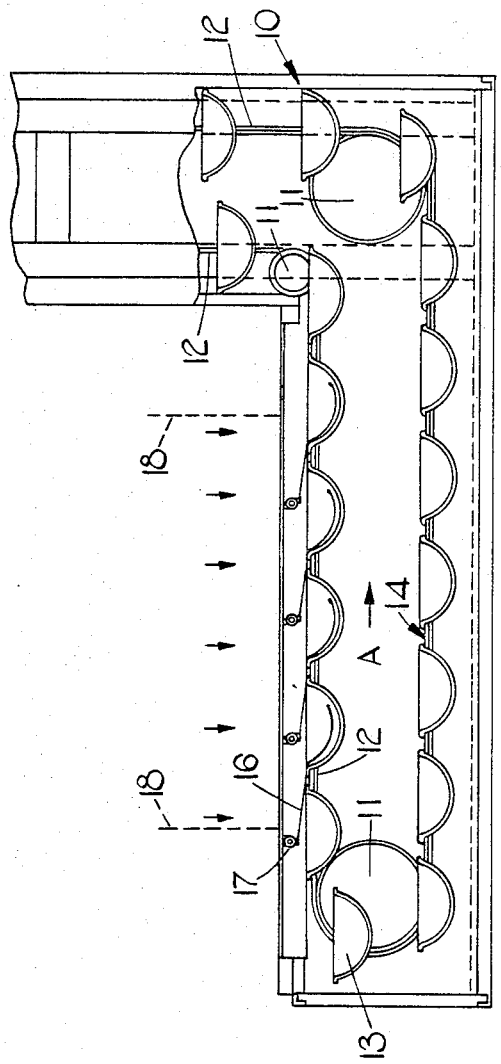
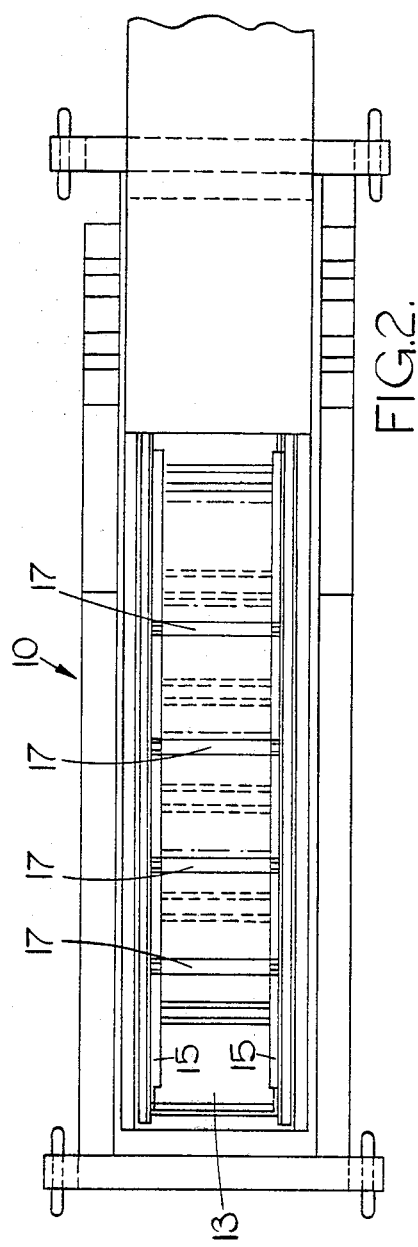

CONVEYORS

This invention relates to a bucket conveyor of the kind comprising a pair of endless spaced chains between which is pivotally supported a plurality of buckets spaced apart in their direction of movement.

Such conveyors are well known in the art for conveying particulate material between a loading zone, where material is loaded into the buckets, and an unloading zone, where the material is unloaded from the buckets for example, by inverting the buckets.

At the loading zone a problem arises in trying to avoid spillage of the material. It is possible to load the buckets individually but this requires a delivery chute capable of moving with the conveyor or alternatively the conveyor may be halted to allow a bucket to be filled. The discharge from the delivery chute may be very carefully timed to ensure that the discharged material falls into the bucket. Each of these methods, however, is complex.

Another solution is to try to ensure that at the loading zone the buckets in effect overlap so that material falling from the delivery chute must fall into a bucket. This solution requires a complex movement of the bucket in the loading zone and requires special chains and guides. Another solution is to provide a lip on each bucket which, in the loading zone, overlaps an adjacent bucket. The lips, however, can cause interference between the buckets particularly where there is a change in the direction of movement of the conveyor.

The object of the present invention is to provide a bucket conveyor in a simple and convenient form.

According to the invention, a bucket conveyor of the kind specified has a loading zone in which material is loaded onto the buckets of the conveyor as they pass through the zone, there being positioned at the loading zone at least one flexibe sheet which is anchored at one end to a fixed part of the conveyor and which in use extends above and in the direction of movement of the buckets, the length of flexible sheet acting during movement of the conveyor to extend over the gap between a pair of adjacent buckets, the loading zone in the case where one sheet only a provided extending between said one end of the sheet and a position short of the length of the sheet whereby when material is fed to the conveyor, from above, the gap between an adjacent pair of buckets will always be covered, the loading zone in the case where a plurality of sheets is provided extending from said one end of the first sheet to adjacent the other end of the last sheet, the sheets being slightly longer than the distance between said one ends of an adjacent pair of sheets.

An example of a bucket conveyor in accordance with the invention will now be described with reference to the accompanying drawings, in which:

FIG. 1 is a part sectional side elevation of a part of a conveyor and,

FIG. 2 is a plan view of the portion of the conveyor seen in FIG. 1.

Referring to the drawings, the coveyor comprises a conveyor support structure generally indicated at 10.

The support structure carries pairs of interconnected sprocket wheels 11 at positions where a change in the direction of movement of the buckets of the conveyor is required. The pairs of sprockets carry endless chains 12 respectively between which are mounted a plurality of buckets 13, the buckets being pivotally suppported by the chains at positions such that whether the buckets are empty or full of material, their open side will remain uppermost.

As will be seen from the drawings, a gap exists between the adjacent edges of adjacent buckets, such a gap being indicated at 14. In FIG. 1, the upper run of the conveyor moves in the direction indicated by the arrow A and clearly the lower buckets move in the opposite direction. Material is loaded onto the buckets in the upper run of the conveyor the flow of material being indicated by the vertical arrows. Such material particulate in nature, can be delivered to the upper run of the conveyor by means of a suitable chute (not shown). It will be appreciated that if the material is delivered in a continuous stream then some of the material will falling through the gaps 14. Material is prevented from fall beyond the ends of the buckets by deflector plates indicated at 15.

In order to prevent material falling through the gaps a plurality of flexible sheets are provided such a sheet being indicated at 16. The sheets are disposed above the buckets and extend in the direction of movement of the conveyor. At its leading end each sheet is attached to a transversely extending mounting 17, there being as many mountings as there are sheets. In the particular example four sheets are provided and therefore there are four mountings. The mountings are equispaced. The length of each sheet considered in the direction of the movement of the conveyor is such that it extends beneath the next mounting 17. The sheets are disposed beneath the aforesaid deflector plates and rest on top of the buckets. The free ends of the sheets, however, fall into the buckets partly under their own weight but primarily under the weight of the particulate material.

The material which is fed from the chute falls onto the sheets 16 and will accumulate in the buckets. As the buckets move the sheets therein will be drawn out of the buckets leaving any material on the sheets deposited in the buckets. The gaps 14 will therefore always be covered within the loading zone.

The extent of the loading zone is indicated by the dotted lines 18 and it will be seen at the upstream end of the loading section the line 18 is disposed slightly downstream of the left-hand mounting 17. The other extremity of the loading zone is slightly upstream considered in terms of the direction of movement of the conveyor, of the free end of the last sheet. The free end of the last sheet is shown by chain dotting in FIG. 2 to correspond with the free ends of the remaining sheets. It will be understood, however, that the free end of the last sheet is in fact visible.

It will be appreciated that the modification described is extremely simple and it enables the buckets in the loading zone to move along a substantially horizontal path. This means that the conveyor is of a simple construction in this region compared, for example, with known conveyors in which the buckets in the loading zone are arranged to follow a complex path so that in effect, they overlap each other. As a result it is possible to use simple chains 12 and these may be formed from plastics material making the conveyor particularly useful for use in the food industry.

The sheets are formed from plastics material of any suitable composition, bearing in mind that it must be sufficiently flexible to conform to the contour of the buckets during their movement. The material must also be unaffected by the particulate material and should preferably be such as can withstand washing and/or sterilisation. Moreover, it is convenient to form the mountings 17 from plastics pipe which is provided with a slit through which the end of the sheet extends into the interior of the pipe, the pipe accommodating a rod or the like to hold the sheet in position.

I claim:

1. A bucket conveyor comprising:

a pair of endless spaced chains;

a plurality of spaced apart buckets, each bucket pivotally supported between said chains, said buckets moving and having a direction of movement, said buckets further having spaces therebetween in said direction of movement;

means defining a loading zone for dropping material into said buckets during said movement, said loading zone extending beyond a single bucket in said movement direction; and means for preventing said material from falling into said spaces between said buckets, said preventing means comprising a plurality of spaced apart sheets, each sheet comprising a length of flexible sheet having at least two ends, one end of said sheet located above and fixed relative to said loading zone, the other end of said sheet laying on said spaced apart buckets, said sheets extending from said fixed ends toward said direction of movement, each of said sheets having a length slightly longer than a distance between said fixed ends of adjacent sheets.

2. A conveyor according to claim 1 in which the sheet is formed from material which is sufficiently flexible to allow it to conform to the shape of the buckets under the weight of the material supplied at the loading zone.

3. A conveyor according to claim 1 or claim 2 wherein said preventing means further includes a tubular mounting in which said one end of each sheet is passed through a slit formed in the wall of said tubular mounting.

4. A conveyor according to claim 3 in which the tubular mounting is constructed from plastics pipe.

* * * * *